(12) United States Patent
Haas

(10) Patent No.: US 8,363,684 B2
(45) Date of Patent: Jan. 29, 2013

(54) METHOD OF MULTIPLE LANE DISTRIBUTION (MLD) DESKEW

(75) Inventor: Wally Haas, Mount Pearl (CA)

(73) Assignee: Altera Canada Co., Halifax, NS (CA)

( * ) Notice: Subject to any disclaimer, the term of this patent is extended or adjusted under 35 U.S.C. 154(b) by 0 days.

(21) Appl. No.: 13/399,673

(22) Filed: Feb. 17, 2012

(65) Prior Publication Data

US 2012/0147905 A1 Jun. 14, 2012

Related U.S. Application Data

(63) Continuation of application No. 12/488,836, filed on Jun. 22, 2009, now Pat. No. 8,199,782.

(60) Provisional application No. 61/154,058, filed on Feb. 20, 2009.

(51) Int. Cl.
*H04J 3/04* (2006.01)
*H04J 3/02* (2006.01)
*H04Q 11/00* (2006.01)

(52) U.S. Cl. ......... 370/536; 370/366; 370/537; 370/542

(58) Field of Classification Search ........................ None
See application file for complete search history.

(56) References Cited

U.S. PATENT DOCUMENTS

| | | | | |
|---|---|---|---|---|
| 6,215,798 B1 * | 4/2001 | Carneheim et al. | ........... | 370/515 |
| 6,757,348 B1 | 6/2004 | Vila et al. | | |
| 6,768,734 B2 * | 7/2004 | Wenk | ............................. | 370/366 |
| 6,907,552 B2 | 6/2005 | Collins | | |
| 7,058,090 B1 * | 6/2006 | Player et al. | ................... | 370/536 |
| 7,184,442 B1 * | 2/2007 | Roos | ............................. | 370/412 |
| 7,362,779 B1 * | 4/2008 | Zabezhinsky | ................. | 370/512 |
| 7,554,975 B2 * | 6/2009 | Smith | ............................. | 370/369 |
| 7,826,480 B1 * | 11/2010 | Sethuram et al. | ............. | 370/466 |
| 2002/0029355 A1 | 3/2002 | Sakamoto et al. | | |
| 2002/0118668 A1 * | 8/2002 | Sawey et al. | ................... | 370/350 |
| 2006/0256875 A1 * | 11/2006 | McClellan | ..................... | 375/242 |
| 2007/0177701 A1 * | 8/2007 | Thanigasalam | ................ | 375/372 |
| 2008/0130814 A1 * | 6/2008 | Li et al. | ......................... | 375/372 |
| 2010/0265953 A1 * | 10/2010 | Xiao et al. | ..................... | 370/394 |

* cited by examiner

*Primary Examiner* — Clemence Han
(74) *Attorney, Agent, or Firm* — Ropes & Gray LLP

(57) ABSTRACT

The present invention discloses a method of detecting and correcting skew across a plurality of transmitting lanes. Through the use of an N framer system, including a frame start signal and a frame synchronization signal, skew can be detected and corrected by writing data from a plurality of framers into offsetting bit locations of a plurality of buffers. The present invention also provides a method of transmitting data in a multiple lane distribution (MLD) transmission system.

20 Claims, 6 Drawing Sheets

OTN Frame (Prior Art)

OTN Frame OH (Prior Art)

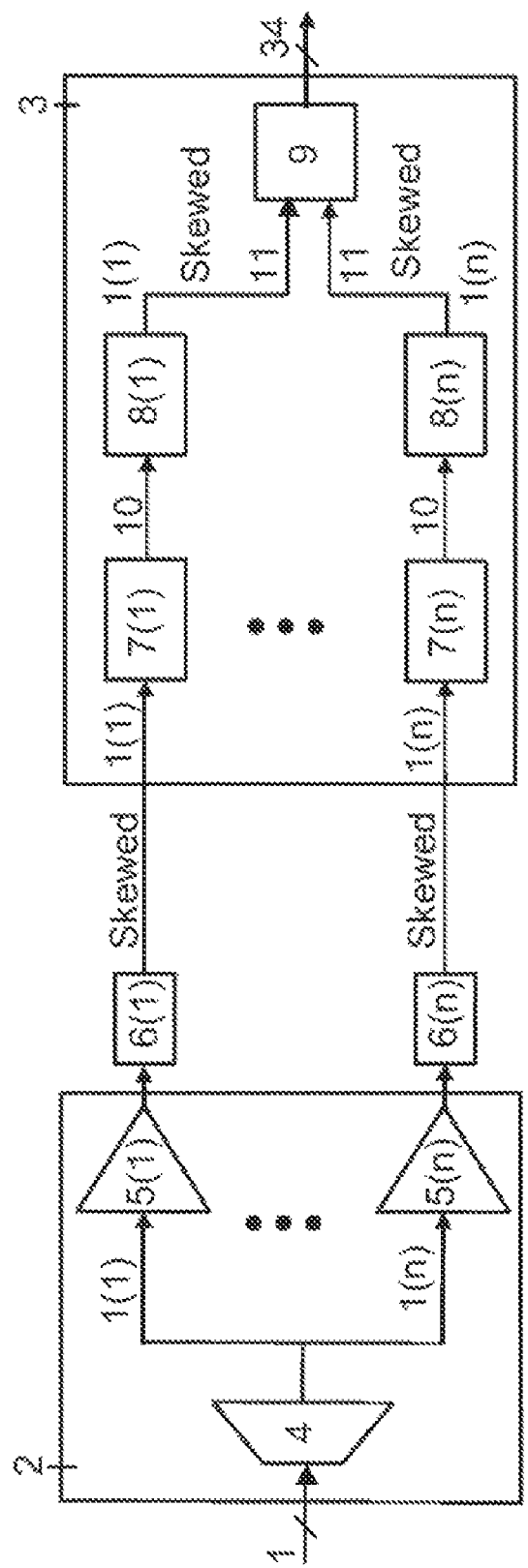

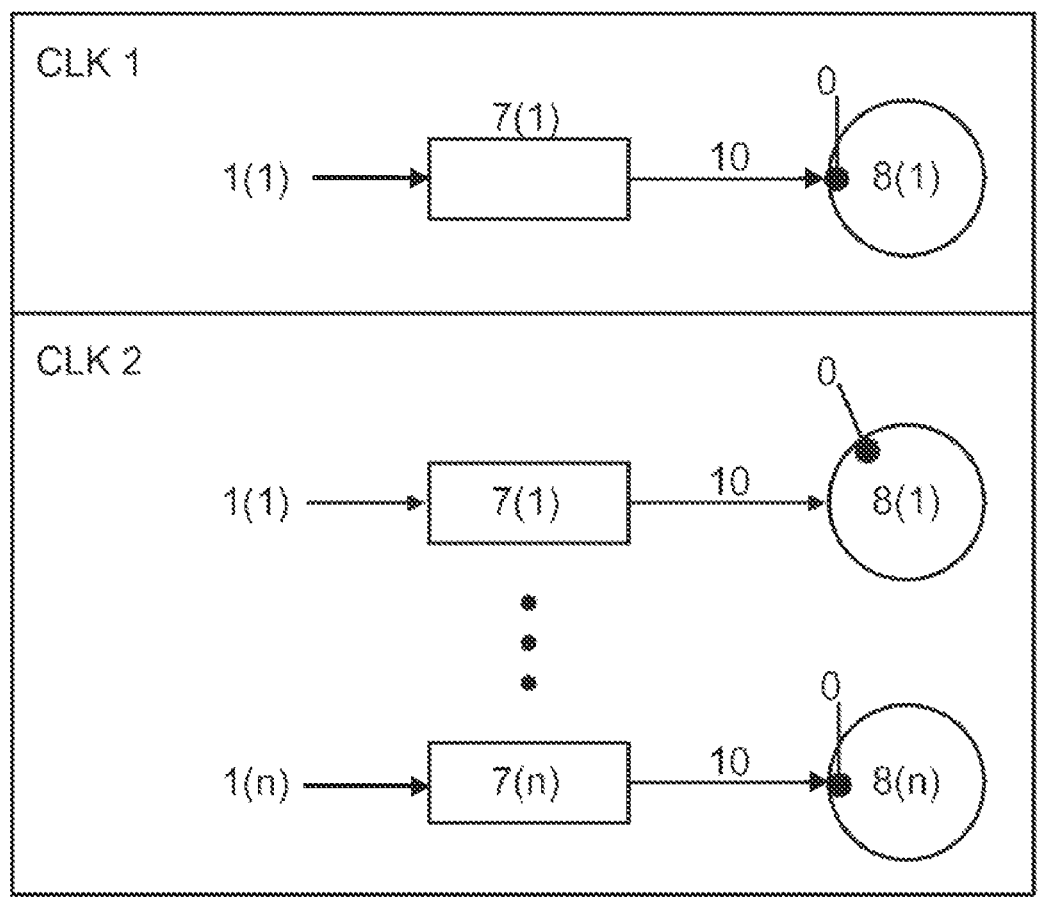
Figure 4: Skewed FIFO Buffers (Prior Art)

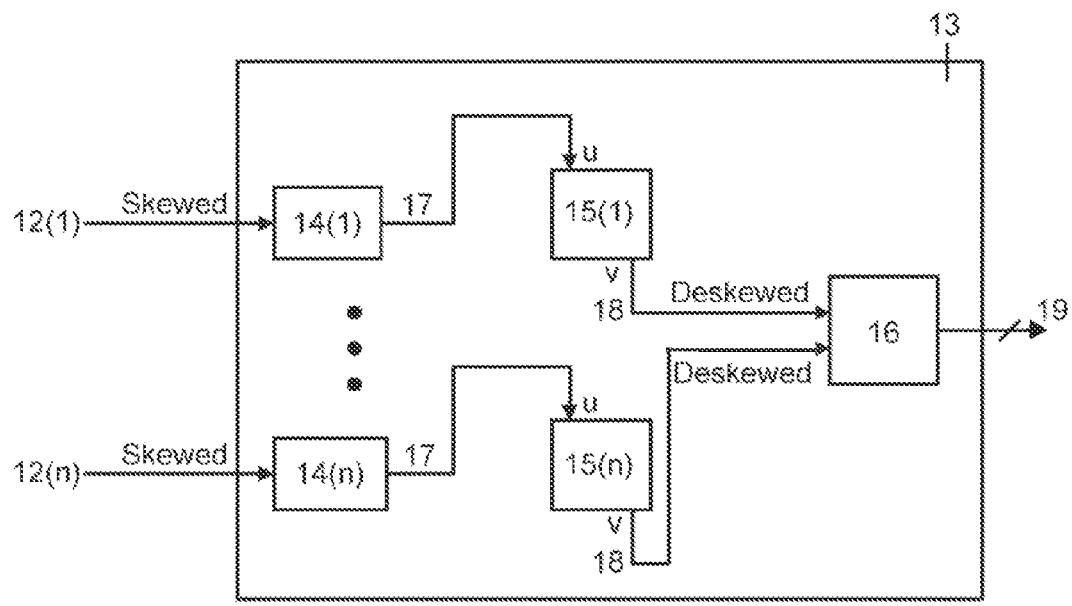

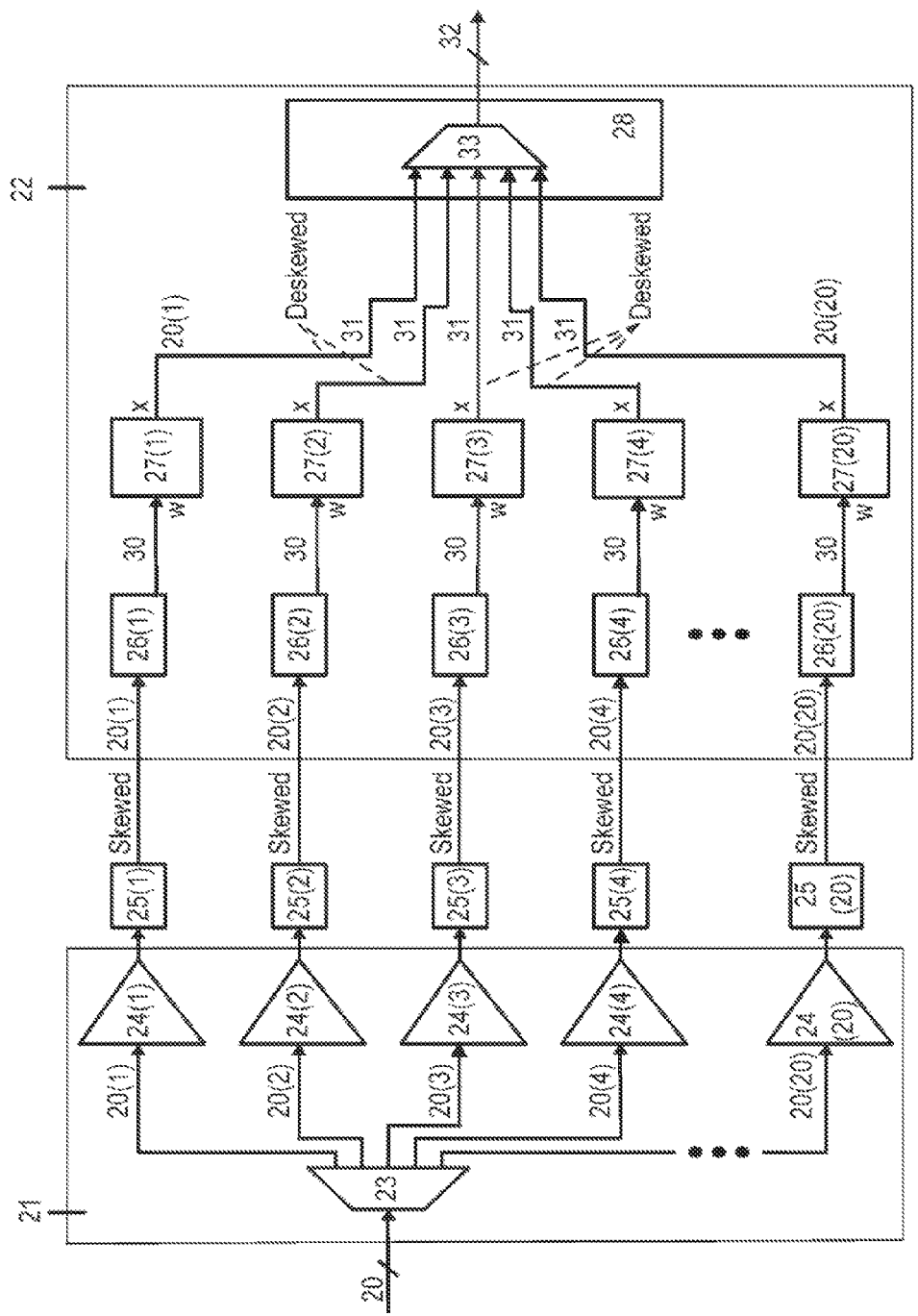

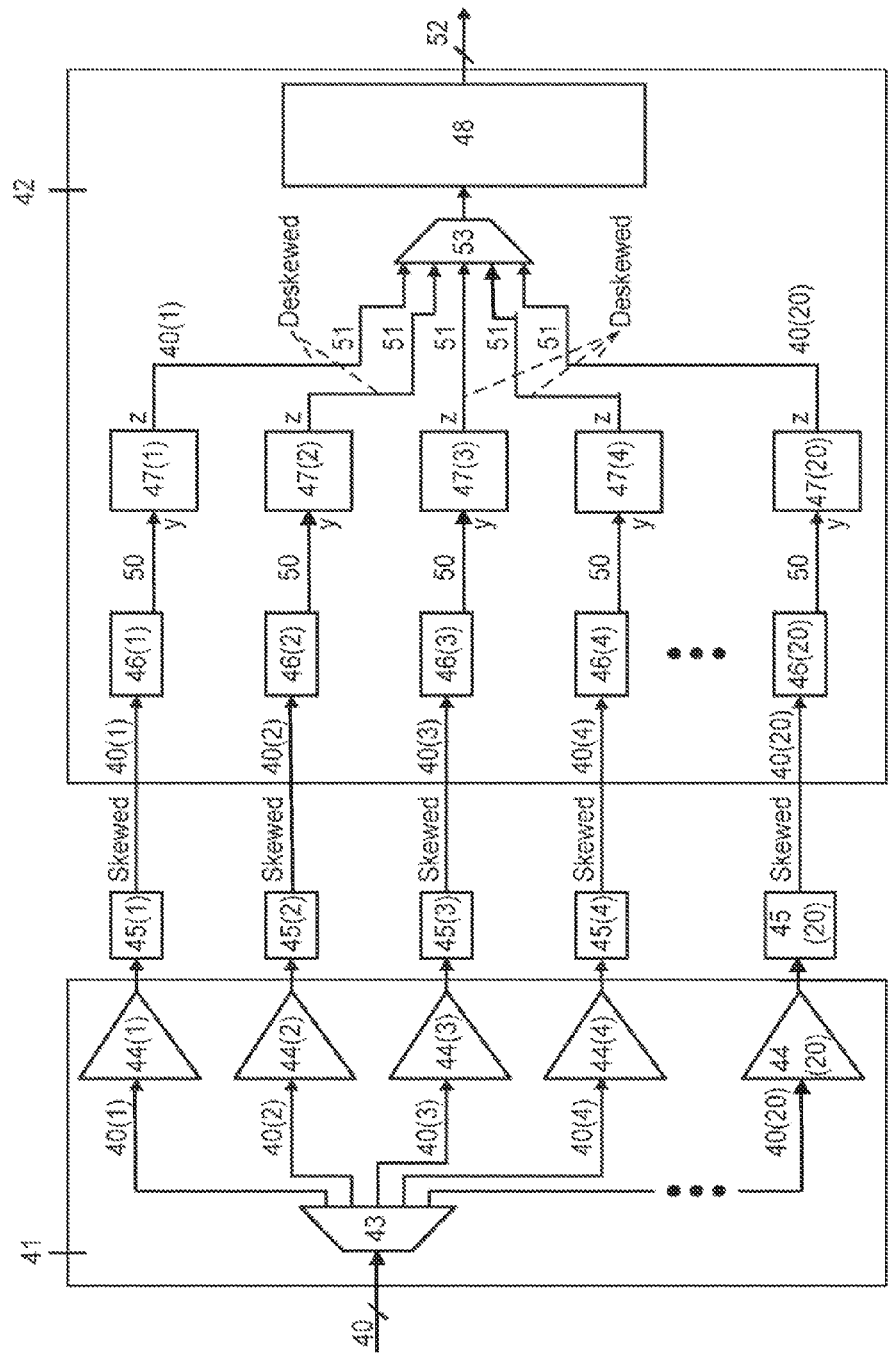
Figure 7: MLD System Deskew Method
(Illustrative Embodiment of the Present Invention)

METHOD OF MULTIPLE LANE DISTRIBUTION (MLD) DESKEW

CROSS-REFERENCE TO RELATED APPLICATIONS

This application is a continuation of U.S. patent application Ser. No. 12/488,836, filed on Jun. 22, 2009 (now U.S. Pat. No. 8,199,782), which claims priority to U.S. Provisional Application No. 61/154,058, filed on Feb. 20, 2009 (now expired), the disclosures of which are hereby incorporated by reference herein in its entireties.

STATEMENT REGARDING FEDERALLY SPONSORED RESEARCH OR DEVELOPMENT

N/A

REFERENCE TO A SEQUENCE LISTING, A TABLE, OR A COMPUTER PROGRAM LISTING COMPACT DISC APPENDIX

N/A

BACKGROUND OF THE INVENTION

1. Technical Field of the Invention

The present invention discloses a method for the elimination of skew across a plurality of bit streams, as found in a Multiple Lane Distribution (MLD) system.

2. Background of the Invention

The International Telecommunication Union, Telecommunication Standardization Sector (ITU-T) Recommendation G.709, "Interfaces for the optical transport network (OTN)" defines the Optical Transport Network (OTN) frame as consisting of three main sections; the 16 byte overhead (OH) section; the 3808 byte payload (PL) section and the 256 byte forward error correction (FEC) section. The structure of the OTN frame is illustrated in FIG. 1. OTN is able to transport via a number of standard transmission rates, defined by Optical Data Unit (ODU) k. To date, transmission rates where k=1, 2 or 3 have been defined, while k=4 is currently under development.

The 16 byte OH section is comprised of the Frame Alignment Signal (FAS), the Optical Transport Unit (OTU) OH, the Optical Data Unit (ODU) OH and the Optical Payload Unit (OPU) OH, as illustrated in FIG. 2. The FAS is located in row 1, columns 1-7 of the OTN frame, and includes the Multi-Frame Alignment Signal (MFAS). The OTU OH is located in row 1, columns 8-14, and is responsible for Section Monitoring (SM) and General Communication Channel 0 (GCC0) and row 1 of columns 13-14 contains bytes reserved for future international standardization (RES). The ODUk OH is located in rows 2-4, columns 1-14, and is responsible for Path Monitoring (PM) Tandem Connection Monitoring (TCM), General Communication Channels 1 and 2 (GCC1/GCC2) ODUk Automatic Protection Switching and Protection Communication Channel (APS/PCC), Fault Type and Fault Location Reporting Communication Channel (FTFL) ODUk Experimental Overhead (EXP) and additional ODUk OH bytes reserved for future international standardization (RES), the reserved OH bytes are located in row 2, columns 1-3, and row 4, columns 9-14. The OPUk OH is located in rows 1-4, columns 15-16, and is responsible for the Payload Structure Identifier (PSI) and the Payload Type (PT), as well as mapping and concatenation operations.

When transmitting a bit stream over any transmission network, such as the aforementioned Optical Transport Network (OTN), it may be impractical to transmit the bit stream serially due to technical or market constraints, such as the high costs associated with utilizing optical components for serial transmissions. Therefore, the single bit stream may be split into multiple bit streams through Multiple Lane Distribution (MLD), allowing the single bit stream to be transmitted in a parallel fashion. MLD encapsulates the data in frames for transmission and either manipulates the transmitted data for re-alignment or uses inherent patterns within the transmitted data for re-alignment.

After a bit stream has been transmitted as multiple bit streams through MLD, each of the multiple bit streams may be skewed, leaving the data unaligned at the receiver. An example of a skewed MLD system is shown in FIG. 3. As illustrated, serial bit stream 1 enters a 1:N de-multiplexer (DE-MUX) 4 located in transmitter 2. The DE-MUX 4 divides serial bit stream 1 into multiple bit streams 1(1)-1(n) through MLD. Each of bit streams 1(1)-1(n) are fed into transmitters 5(1)-5(n), respectively. Bit streams 1(1)-1(n) are then transmitted from the transmitter 2 into channels 6(1)-6(n), where the data may become skewed. Upon arrival at the receiver 3, the skewed bit streams 1(1)-1(n) are fed into framers 7(1)-7(n), respectively, which recognize inherent patterns in the transmitted data necessary for re-alignment or the manipulated data. Framers 7(1)-7(n) each write in 10 the data to buffers or First-In-First-Out (FIFO) buffers 8(1)-8(n). An aggregator 9 then reads out 11 the data from FIFOs 8(1)-8(n). The data may be skewed due to a number of external factors, such as: the data from multiple communication lanes, such as bit streams 1(1) and 1(n), travel at different times or speeds; or the data from framers 7(1)-7(n) are written into 10 the FIFOs 8(1)-8(n) at different times, thereby causing FIFOs 8(1)-8(n), which are cyclical in nature, to rotate out of synchronization. The latter is shown in FIG. 4, where upon a first clock cycle (CLK1), FIFO 8(1) location 0 is the first receive location, but upon a second clock cycle (CLK2), FIFO 8(1) location 0 has rotated to a new location, while FIFO 8(n) location 0 is still at the first receive location. Subsequently, when aggregator 9 of FIG. 3 reads out 11 the data from FIFOs 8(1)-8(n), this data may be skewed due to the differing time periods in which data from each of framers 7(1)-7(n) was written 10 into FIFOs 8(1)-8(n). Bit stream 34, now output from aggregator 9, contains skewed data.

In the "Prepublished Recommendation" G.798, "Characteristics of Optical Transport Network Hierarchy Equipment Functional Blocks," the ITU-T defines an OTL loss of lane alignment defect (dLOL) as generated for multilane interfaces based on the state of the lane alignment process; if the multilane alignment process is in the out-of-alignment (OLA) state for a defined period of time, dLOL is declared. Therefore, a method of eliminating skew across a plurality of bit streams, including compensation for dLOL as found in an MLD system, is required.

BRIEF SUMMARY OF THE INVENTION

The present invention provides a novel method to deskew the bit streams of a Multiple Lane Distribution (MLD) system. To maximize efficiency, the amount of logic duplicated on each bit stream of the MLD is minimized through the use of an N framer system, where N=the total number of framers in the MLD system. In the present invention, a "framer" refers to a machine which recognizes inherent framing patterns in transmitted data which occurs at predictable intervals. In this N framer system, each of the N bit streams enters N framers at a receiver, which subsequently determine the inherent framing patterns within the transmitted data which are necessary for re-alignment. From these inherent framing patterns, the N framers can derive an arbitrary frame start signal and an arbitrary frame synchronization signal. The frame start signal and frame synchronization signal, derived by the N framers, indicate to the N framers to write the transmitted data into a specific, but arbitrary location(s) of N buffers. These arbitrary location(s) of N buffers represent the offsetting bit location in each of the N buffers where the N framers are to start writing the transmitted data to allow the data to be written into the N buffers in a re-aligned fashion. An aggregator can then read out the re-aligned data from the N buffers. In a first embodiment of the invention, the aggregator reads out the re-aligned N bit streams from each of the N buffers, and an internal multiplexer (MUX), contained within the aggregator, combines the re-aligned N bit streams into a single, serial bit stream, and outputs the data from the system as a single serial bit stream. In a second embodiment of the invention, an external MUX is provided just before the aggregator, so that the aggregator reads out a single, serial bit stream from the MUX, as the MUX already has read the N bit streams out from each the N buffers and combined the re-aligned N bit streams into a single, serial bit stream; the aggregator can now read this single, serial bit stream out of the MUX and output the data from the system as a single serial bit stream.

BRIEF DESCRIPTION OF THE DRAWINGS

FIG. 3 is a block diagram illustrating a skewed MLD system (prior art).

FIG. 4 is a block diagram illustrating skewed FIFO buffers (prior art).

FIG. 5 is a block diagram illustrating a deskewed MLD system (the present invention)

FIG. 6 is a block diagram illustrating a first illustrative embodiment of the present invention.

FIG. 7 is a block diagram illustrating a second illustrative embodiment of the present invention.

DETAILED DESCRIPTION OF THE PRESENT INVENTION

Figure 1:
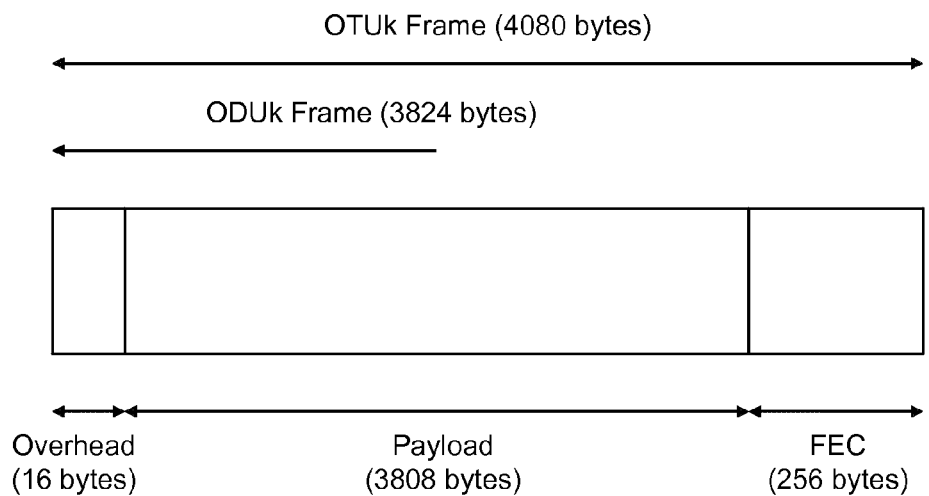
FIG. 1 is a block diagram of the standardized OTN frame (prior art).

The present invention is depicted in FIG. 5, which illustrates a Multiple Lane Distribution (MLD) system with a total of N bit streams. Please note that the N bit streams of FIG. 5 represent any arbitrary number of bit streams, as any number of bit streams may be accommodated.

In FIG. 5, a serial bit stream 12 has been divided into multiple bit streams 12(1)-12(n) through MLD (not shown), and each of bit streams 12(1)-12(n) have been transmitted to receiver 13. Each of bit streams 12(1)-12(n) are fed into framers 14(1)-14(n), respectively. Framers 14(1)-14(n) wait to detect a frame start signal, which can be any arbitrary and user-definable frame start signal, and a frame synchronization signal, which can be any arbitrary and user-definable frame synchronization signal, from the incoming data. Both the frame start signal and the frame synchronization signal are deciphered from the incoming data by framers 14(1)-14(n), as framers 14(1)-14(n) are able to recognize inherent framing patterns within the incoming data and can subsequently identify the frame start signal and the frame synchronization signal from these inherent framing patterns.

The frame start signal is a repeating pattern which, upon detection, identifies the start of frame within the incoming data to framers 14(1)-14(n). Once the frame has been identified, the frame synchronization signal, located within the frame, acts as a lane-marker, indicating to framers 14(1)-14(n) which lane of the MLD system the incoming data had originated from. Therefore, together the frame start signal and the frame synchronization signal indicate to framers 14(1)-14(n) where the data should be located once the lanes from the MLD are re-aligned.

Framers 14(1)-14(n) now write in 17 data to a specific, but arbitrary and user-definable location of buffers or First-In-First-Out (FIFO) buffers 15(1)-15(n). Please note that these buffers or FIFOs may be any arbitrary size. With the frame start signal acting as a frame indicator and the frame synchronization signal acting as a lane indicator, the incoming data can be written into starting bit locations of each of FIFOs 15(1)-15(n) to properly offset and align the data. For illustrative purposes, the present embodiment writes in 17 data to location u of FIFOs 15(1)-15(n), where location u represents the offsetting bit location in each of FIFOs 15(1)-15(n) where framers 14(1)-14(n) are to start writing the transmitted data; therefore location u may refer to any bit location within FIFOs 15(1)-15(n) and location u may be different within each of FIFOs 15(1)-15(n). For example, lane 0 may be required to be written into bit location 0 of any of FIFOs 15(1)-15(n); lane 1 may be required to be written into bit location 1 of any of FIFOs 15(1)-15(n); lane 2 may be required to be written into bit location 2 of any of FIFOs 15(1)-15(n); and so on. Please note that this example is provided for illustrative purposes only, and is not mean to limit the scope of the invention, as any lane may be required to be written into any starting bit location of FIFOs 15(1)-15(n) to properly offset the data and achieve lane alignment.

With the incoming data stored in FIFOs 15(1)-15(n), aggregator 16 can now concurrently read out 18 the deskewed, re-aligned data from a specific, but arbitrary and user-definable location of each of FIFOs 15(1)-15(n). For illustrative purposes the present embodiment reads out 18 the data from location v of FIFOs 15(1)-15(n). Once the data is read out 18 from FIFOs 15(1)-15(n), the deskewed bit streams are recombined into a serial bit stream (not shown) and aggregator 16 outputs the serial bit stream 19 from the system.

DETAILED DESCRIPTION OF ILLUSTRATIVE EMBODIMENTS OF THE PRESENT INVENTION

Two illustrative embodiments of the present invention are further provided, disclosing a MLD system as applied to a 100 Gigabit (G) OTN transmission system. Please note that these illustrative embodiments are provided for explanative purposes only and are not meant to limit the scope of the present invention, as any transmission system of any size may be accommodated.

Example One

In the first illustrative embodiment of the invention, a single bit stream in 100 G OTN is divided through MLD into 20 independent lanes to transmit data in a parallel fashion; this is illustrated in FIG. 6, where serial bit stream 20 is divided into 20 independent bit streams 20(1)-20(20) as MLD is implemented by a 1:N DE-MUX 23 located in transmitter 21. Each of bit streams 20(1)-20(20) are fed into transmitters 24(1)-24(20), respectively, and are then output from transmitter 21 into channels 25(1)-25(20) where the data becomes skewed. As illustrated, each of the skewed bit streams 20(1)-20(20) arrive at receiver 22 and are frequency locked with their own clock domain and their own framer from framers 26(1)-26(20). Once each of bit streams 20(1)-20(20) are fed into framers 26(1)-26(20), respectively, the framers 26(1)-26(20) wait to detect a frame start signal, or the Frame Alignment Signal (FAS), and a frame synchronization signal, or the Multiple Lane Alignment Signal (MLAS). Framers 26(1)-26(20) decipher both the FAS and MLAS from the inherent framing patterns in the transmitted data, and both the FAS and MLAS are distributed to each of the 20 bit streams 20(1)-20(20). The FAS is a repeating pattern which, upon detection, identifies the frame within the incoming data to framers 26(1)-26(20). Once the frame has been identified, the MLAS, located within the frame, acts as a lane-marker and indicates to framers 26(1)-26(20) which lane of the MLD system the incoming data had originated from. Therefore, together the FAS and MLAS indicate to each of framers 26(1)-26(20) where the data from bit streams 20(1)-20(20) should be located once the lanes from the MLD system are re-aligned. Framers 26(1)-26(20) are now able to write in 30 data to a specific, but arbitrary and user-definable location of each of FIFOs 27(1)-27(20). With the FAS acting as a frame indicator and the MLAS acting as a lane indicator, the incoming data can be written into starting bit locations, locations w, of FIFOs 27(1)-27(20) to properly offset and align the data. For illustrative purposes, the present embodiment writes in 30 the data from each lane into location w of FIFOs 27(1)-27(20), where location w represents the offsetting bit location in each of FIFOs 27(1)-27(20) where framers 26(1)-26(20) are to start writing the transmitted data; therefore location w may refer to any bit location within FIFOs 27(1)-27(20) and location w may be different within each of FIFOs 27(1)-27(20). For example, lane 0 may be required to be written into bit location 0 of any of FIFOs 27(1)-27(20); lane 1 may be required to be written into bit location 1 of any of FIFOs 27(1)-27(20); lane 2 may be required to be written into bit location 2 of any of FIFOs 27(1)-27(20); and so on. Please note that this example is provided for illustrative purposes only, and is not mean to limit the scope of the invention, as any lane may be required to be written into any starting bit location of FIFOs 27(1)-27(20) to properly offset the data and achieve lane alignment.

Figure 2:
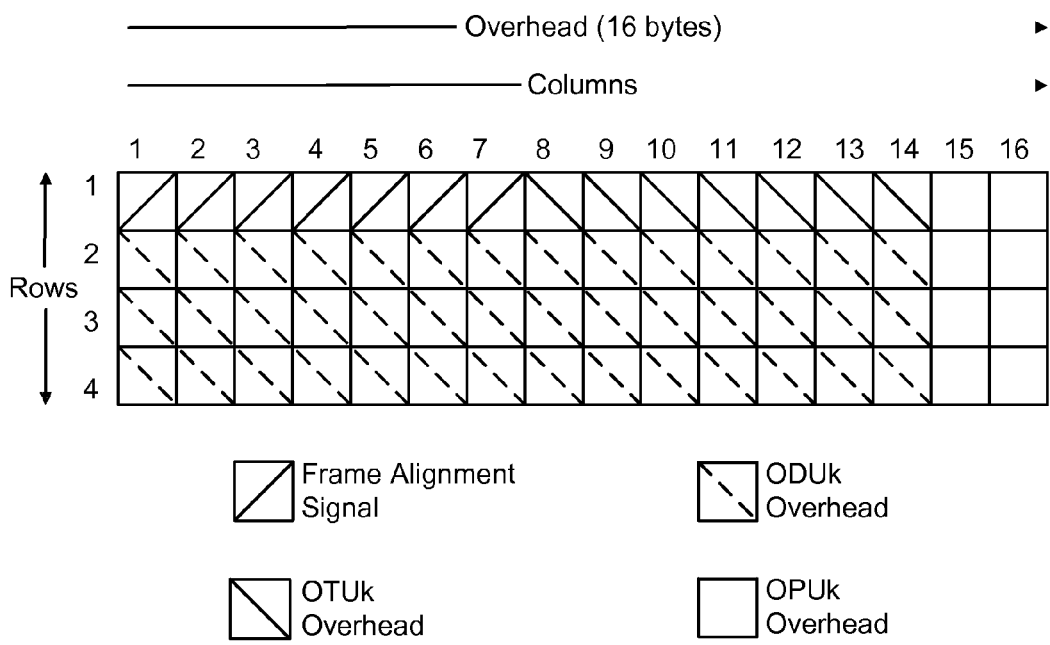
FIG. 2 is a block diagram of the standardized OTN frame OH (prior art).

Use of the MLAS is necessary due to the location of the FAS at the start of the OTN frame, as illustrated in FIG. 2; depending on how many lanes exist in the MLD system, the FAS may arrive at one bit stream many bit times later than it arrives at another bit stream. In the first embodiment of the invention, as illustrated in FIG. 6, the FAS may arrive at bit stream 20(20) many bit times later than it arrives at bit stream 20(1). This delay is accounted for through the use of FIFOs 27(1)-27(20), as the FAS and MLAS together allow framers 26(1)-26(20) to write in 30 the data to offsetting bit locations of each of FIFOs 27(1)-27(20). At the start of frame, as signaled by FAS, the framers 26(1)-26(20) do not all write in 30 the data to FIFOs 27(1)-27(20) concurrently, but instead, framers 26(1)-26(20) wait to decipher MLAS and determine the offsetting bit locations to align the data, locations w, and subsequently write in 30 the data to these offsetting bit locations of FIFOs 27(1)-27(20).

In the first illustrative embodiment of the present invention, an aggregator 28 reads out 31 the re-aligned data from a specific, but arbitrary and user-definable location of each of FIFOs 27(1)-27(20). For illustrative purposes, the present embodiment reads out 31 the re-aligned bit streams 20(1)-20(20) from location x of each of FIFOs 27(1)-27(20). Unlike location w, which can be any bit location in any of FIFOs 27(1)-27(20) (for example, bit location 0 in FIFO 27(3) and bit location 4 in FIFO 27(8)), location x must remain the same bit location in each of FIFOs 27(1)-27(20), (for example, bit location 0 in FIFO 27(3) and bit location 0 in FIFO 27(8)). Once at aggregator 28, the multiple bit streams 20(1)-20(20) are re-combined by an internal 1:N MUX 33, or any other circuitry elements, located within aggregator 28. The newly recombined serial bit stream 32 is now output from receiver 22.

Example Two

In the second illustrative embodiment of the invention, a single bit stream in 100 G OTN is divided through MLD into 20 independent lanes to transmit data in a parallel fashion; this is illustrated in FIG. 7, where serial bit stream 40 is divided into 20 independent bit streams 40(1)-40(20) as MLD is implemented by a 1:N DE-MUX 43 located in transmitter 41. Each of bit streams 40(1)-40(20) are fed into transmitters 44(1)-44(20), respectively, and are then output from transmitter 41 into channels 45(1)-45(20) where the data becomes skewed. As illustrated, each of the skewed bit streams 40(1)-40(20) arrive at receiver 42 and are frequency locked with their own clock domain and their own framer from framers 46(1)-46(20). Once each of bit streams 40(1)-40(20) are fed into framers 46(1)-46(20), respectively, the framers 46(1)-46(20) wait to detect a frame start signal, or the Frame Alignment Signal (FAS), and a frame synchronization signal, or the Multiple Lane Alignment Signal (MLAS). Framers 46(1)-46(20) decipher both the FAS and MLAS from the inherent framing patterns in the transmitted data, and both the FAS and MLAS are distributed to each of the 20 bit streams 40(1)-40(20). The FAS is a repeating pattern which, upon detection, identifies the frame within the incoming data to framers 46(1)-46(20). Once the frame has been identified, the MLAS, located within the frame, acts as a lane-marker and indicates to framers 46(1)-46(20) which lane of the MLD system the incoming data had originated from. Therefore, together the FAS and MLAS indicate to each of framers 46(1)-46(20) where the data from bit streams 40(1)-40(20) should be located once the lanes from the MLD system are re-aligned. Framers 46(1)-46(20) are now able to write in 50 data to a specific, but arbitrary and user-definable location of each of FIFOs 47(1)-47(20). With the FAS acting as a frame indicator and the MLAS acting as a lane indicator, the incoming data can be written into starting bit locations, locations y, of FIFOs 47(1)-47(20) to properly offset and align the data. For illustrative purposes, the present embodiment writes in 50 the data from each lane into location y of FIFOs 47(1)-47(20), where location y represents the offsetting bit location in each of FIFOs 47(1)-47(20) where framers 46(1)-46(20) are to start writing the transmitted data; therefore location y may refer to any bit location within FIFOs 47(1)-47(20) and location y may be different within each of FIFOs 47(1)-47(20). For example, lane 0 may be required to be written into bit location 0 of any of FIFOs 47(1)-47(20); lane 1 may be required to be written into bit location 1 of any of FIFOs 47(1)-47(20); lane 2 may be required to be written into bit location 2 of any of FIFOs 47(1)-47(20); and so on. Please note that this example is provided for illustrative purposes only, and is not mean to limit the scope of the invention, as any lane may be required to be written into any starting bit location of FIFOs 47(1)-47(20) to properly offset the data and achieve lane alignment.

Again, use of the MLAS is necessary due to the location of the FAS at the start of the OTN frame, as illustrated in FIG. 2;

depending on how many lanes exist in the MLD system, the FAS may arrive at one bit stream many bit times later than it arrives at another bit stream. In the second embodiment of the invention, as illustrated in FIG. 7, the FAS may arrive at bit stream 40(20) many bit times later than it arrives at bit stream 40(1). This delay is accounted for through the use of FIFOs 47(1)-47(20), as the FAS and MLAS together allow framers 46(1)-46(20) to write in 50 the data to offsetting bit locations of each of FIFOs 47(1)-47(20). At the start of frame, as signaled by FAS, the framers 46(1)-46(20) do not all write in 50 data to FIFOs 47(1)-47(20) concurrently, but instead, framers 46(1)-46(20) wait to decipher MLAS and determine the offsetting bit locations to align the data, locations y, and subsequently write in 50 the data to these offsetting bit locations of FIFOs 47(1)-47(20).

In the second illustrative embodiment of the present invention, an aggregator 48 reads out 51 the re-aligned data from a specific, but arbitrary and user-definable location of each of FIFOs 47(1)-47(20). For illustrative purposes, the present embodiment reads out 51 the re-aligned bit streams 40(1)-40(20) from location z of each of FIFOs 47(1)-47(20). Unlike location y, which can be any bit location in any of FIFOs 47(1)-47(20) (for example, bit location 0 in FIFO 47(3) and bit location 4 in FIFO 47(8)), location z must remain the same bit location in each of FIFOs 47(1)-47(20) (for example, bit location 0 in FIFO 47(3) and bit location 0 in FIFO 47(8)). Prior to being written into aggregator 48, each of the multiple bit streams 40(1)-40(20) are re-combined by an external 1:N MUX 53, or any other circuitry elements, located just before aggregator 48. The newly recombined serial bit stream 52 is then input to aggregator 48 and is subsequently output from receiver 52.

I claim:

1. A system comprising processing circuitry configured to:
   receive a data stream on a communication path;
   detect a frame start signal in the received data stream;
   detect a frame synchronization signal in the received data stream;
   compute a bit offset based on the frame start signal and frame synchronization signal; and
   write the received data stream to buffer circuitry based on the computed bit offset.

2. The system of claim 1, wherein said data stream is received on a plurality of data lanes.

3. The system of claim 2, wherein computing the bit offset comprises detecting skew between the plurality of data lanes.

4. A plurality of processing circuitries as in claim 1, wherein computing the bit offset for each processing circuitry of the plurality of processing circuitries comprises comparing frame start signals and frame synchronization signals detected by each processing circuitry of the plurality of processing circuitries.

5. A plurality of processing circuitries as in claim 1, further comprising aggregator circuitry configured to:
   receive data from buffer circuitries of each processing circuitry of the plurality of processing circuitries; and
   combine the data received from the buffer circuitries into a single data stream.

6. The system of claim 5, wherein the aggregator circuitry comprises a multiplexor.

7. The system of claim 1, wherein the buffer circuitry comprises a First-In-First-Out (FIFO) buffer circuitry.

8. A method comprising:
   receiving, with processing circuitry, a data stream on a communication path;
   detecting a frame start signal in the received data stream;
   detecting a frame synchronization signal in the received data stream;
   computing a bit offset based on the frame start signal and frame synchronization signal; and
   writing the received data stream to buffer circuitry based on the computed bit offset.

9. The method of claim 8, wherein said data stream is received on a plurality of data lanes.

10. The method of claim 9, wherein computing the bit offset comprises detecting skew between the plurality of data lanes.

11. The method of claim 8, wherein:
    the processing circuitry comprises a plurality of further processing circuitries, and
    computing the bit offset comprises comparing frame start signals and frame synchronization signals detected by each further processing circuitry of the plurality of further processing circuitries.

12. The method of claim 8, wherein the processing circuitry comprises a plurality of further processing circuitries, further comprising:
    receiving, with aggregator circuitry data from buffer circuitries of each further processing circuitry of the plurality of further processing circuitries; and
    combining the data received from the buffer circuitries into a single data stream.

13. The method of claim 12, wherein the aggregator circuitry comprises a multiplexor.

14. The method of claim 8, wherein the buffer circuitry comprises a First-In-First-Out (FIFO) buffer circuitry.

15. A system comprising:
    a plurality of processing circuitries, wherein each processing circuitry of the plurality of processing circuitries is configured to:
       receive data on a data lane of a plurality of data lanes,
       detect a frame start signal in the received data,
       detect a frame synchronization signal in the received data,
       compute a bit offset based on the frame start signal and frame synchronization signal, and
       write the received data stream to a buffer circuitry of a plurality buffer circuitries based on the computed bit offset; and
    aggregator circuitry configured to combine the data streams from the plurality of buffer circuitries into a single data stream.

16. The system of claim 15, wherein:
    the data received by the each processing circuitry on the data lane of the plurality of data lanes comprises a plurality of frames, and
    detecting the frame start signal and the frame synchronization signal in the data lane of the plurality of data lanes comprises detecting the frame start signal and the frame synchronization signal in each frame of the plurality of frames.

17. The system of claim 15, wherein computing the bit offset comprises detecting skew between the plurality of data lanes.

18. The system of claim 15, wherein computing the bit offset comprises comparing frame start signals and frame synchronization signals detected by the each processing circuitry of the plurality of processing circuitries.

19. The system of claim 15, wherein the buffer circuitry comprises a First-In-First-Out (FIFO) buffer circuitry.

20. The system of claim 15, wherein the aggregator circuitry comprises a multiplexor.

* * * * *